United States Patent [19]

Rao

[11] Patent Number: 5,126,217
[45] Date of Patent: Jun. 30, 1992

[54] FRAME FOR MODULAR, MULTICELL LEAD-ACID BATTERIES AND SUCH MODULAR BATTERIES

[75] Inventor: Purushothama Rao, Eagan, Minn.

[73] Assignee: GNB Incorporated, Mendota Heights, Minn.

[21] Appl. No.: 680,809

[22] Filed: Mar. 26, 1991

[51] Int. Cl.⁵ .................. H01M 4/68; H01M 2/16
[52] U.S. Cl. .................. 429/149; 429/234; 429/242
[58] Field of Search .............. 429/149, 226, 234, 242

[56] References Cited

U.S. PATENT DOCUMENTS

| | | |
|---|---|---|
| 4,209,575 | 6/1980 | McDowall et al. ........... 429/234 X |
| 4,279,977 | 7/1981 | Matter ........................ 429/226 X |
| 4,331,747 | 5/1982 | Julian et al. ................. 429/234 X |
| 4,554,228 | 11/1985 | Kiessling ................... 429/234 X |

FOREIGN PATENT DOCUMENTS 60-220561  11/1985  Japan ................................ 429/226

Primary Examiner—Stephen Kalafut
Attorney, Agent, or Firm—Leydig, Voit & Mayer

[57] ABSTRACT

A modular multicell battery is disclosed which is assembled from a plurality of pairs of terminal and floater frames, each pair separated by a separator frame, that are welded together. The terminal and floater frames include a mesh grid made using a lead-based alloy having, based upon this total weight of the alloy, a calcium content of 0.02–0.04% and a tin content of 0.3–0.5%.

8 Claims, 4 Drawing Sheets

FRAME FOR MODULAR, MULTICELL LEAD-ACID BATTERIES AND SUCH MODULAR BATTERIES

This invention relates to modular, multicell, leadacid batteries, and, more particularly, to alloys used to form the grids of such batteries.

BACKGROUND OF THE INVENTION

U.S. Pat. Nos. 3,941,615; 4,022,951 and 4,209,575 all disclose modular, multicell batteries of particularly unique configurations. In general, such multicell batteries comprise a plurality of frames, each of which is divided into a number of side-by-side active paste support areas. The frames are assembled and secured together in a stacked arrangement so that the perimeter partitions of the frames form the top, bottom and two opposite sides of the battery, and the divisions in the frames form cell partitions. Each frame is pasted with active material to form plates with adjacent plates in each frame being of opposite polarity and adjacent plates in each frame being of opposite polarity and adjacent plates in adjoining frames also being of opposite polarity. An electrolyte-porous separator material is provided between adjacent plates in adjoining frames.

U.S. Pat. No. 4,239,839 shows a similar type of configuration. However, in this configuration, a barrier frame is interposed and secured between, two frames in the assembly. This forms a chemical and electrical barrier between the active battery material in frames on opposite sides of the barrier member so that the assembly of frames can form two batteries having the desired voltage and/or capacity.

The modular, multicell battery described in the aforementioned patents represents a total departure from traditional, lead-acid battery constructions used for SLI automotive applications. Freed from the restrictions of a conventional premolded container, the capacity of such unique modular batteries can be increased merely by the addition of suitable grid frames with a separator frame placed in between.

The advantages are substantial. Such modular batteries may be produced in a highly automated manufacturing process and involve fewer components than are utilized in conventional lead-acid batteries.

Moreover, from the performance standpoint, such modular batteries with less weight can deliver equivalent performance to conventionally made lead-acid batteries. Indeed, such modular batteries can deliver up to 30% more current or power output per pound than a conventional lead-acid battery at 60° F. and higher, due to the shorter current path and due to the lower solid electrical resistance component of the total battery electrical resistance. This accordingly means that, at such elevated temperatures, such modular batteries have lower electrical resistance than an equivalent size and capacity of a conventionally designed automotive battery. A further advantage is that there is no intercell connection failure mode in such modular batteries in comparison to conventionally designed automotive batteries in which intercell weld or connection failure is one of the principal failure modes in service.

The grids used in such modular batteries have been made using rolled strips or wrought alloys. Such strips are then slit or cut and expanded using reciprocating dies to form the mesh grids. This type of technology is well known. Typically, the formed grid mesh will have a thickness in the range of from about 20 to 40 mils or so. Likewise, commercially available modular batteries have utilized calcium-tin-lead alloys wherein the calcium content is relatively high, viz-in the range of from about 0.065 to about 0.08% by weight of the total alloy composition. The tin content in such alloys has been in the general range of about 0.5 to 0.8% by weight.

In recent years, due to various reasons, there has been a substantial increase in the under-the-hood temperature to which a battery is exposed in automobile service. This under-the-hood temperature is obviously higher in the warmer climates. One battery manufacturer has perceived that in past three years or so the temperature in such warmer climates to which an SLI battery is exposed in new automobiles has risen from about 125° F. to 165° F.

It is not particularly significant as to whether this particular level of temperature increase is what has occurred. What is significant is that, as a fact, the under-the-hood temperature conditions to which an SLI battery is exposed has risen significantly in new automobiles.

It has been discovered that, when modular batteries are placed in environments where relatively high temperatures are involved, premature battery failure due to positive grid corrosion can result. The possibility of such premature failure obviously lessens the utility of such modular batteries.

There has been a wide variety of calcium-tin-lead alloys which have been discussed in the patent and other literature for use in forming battery grids for conventional, lead-acid batteries. U.S. Pat. No. 2,860,969 to Walsh is thus directed to the inclusion of cerium as a grain refiner for lead-calcium, lead-tin-calcium, and lead-tin-silver-calcium alloys, which alloys can also contain small amounts of aluminum. The calcium contents disclosed range from about 0.03 to 0.1%.

U.S. Pat. No. 4,125,690 to Bagshaw et al. notes that, at calcium contents below 0.075%, the material is insufficiently hard within acceptable periods of time and that the corrosion of the alloy is greater as the tin content increases above 1%. Bagshaw et al found that greatly improved results were obtained with alloys having a selected combination of calcium, tin and aluminum. The calcium content in such alloys ranged from 0.075–0.13% by weight.

Further, the St. Joe Minerals Company publication by Rose and Young entitled "Lead-Calcium (-tin) Alloys: Properties and Prospects" discloses and describes a wide variety of calcium-tin-lead alloys together with the properties of both cast and wrought alloys. Table 2 sets forth the properties of five St. Joe alloys having calcium contents in the range of from 0.03 to 0.06% and 0.3 to 1.5% tin.

The foregoing prior work are only illustrative examples of the work that has been carried out. Substantial work on calcium-tin-lead alloys has been undertaken in conjunction with use in maintenance-free batteries.

Despite this wide variety of interest and discussion of a wide variety of alloys, there is little direction that would permit the selection of an alloy composition that would have enhanced positive grid corrosion resistance, particularly when exposed to relatively high temperature conditions. This is particularly true for the unique modular, multicell batteries previously described.

It is accordingly an object of the present invention to provide a modular, multicell battery capable of a satisfactory service life when exposed to relatively high temperature environments.

Another and more specific object provides a frame having a grid made from an alloy that imparts to the resulting battery enhanced positive grid corrosion resistance.

Other objects and advantages will be apparent as the following description proceeds, taken in conjunction with the accompanying drawings.

SUMMARY OF THE INVENTION

In accordance with the present invention, it has been found that a frame, utilizing a grid formed from an alloy having, based upon the total weight of the alloy, a composition of: calcium in the range from about 0.02 to about 0.04% by weight, tin in the range of from about 0.3 to about 0.5% by weight, and the remainder lead, imparts to the resulting modular, multicell battery enhanced positive grid corrosion resistance in comparison to batteries of the same configuration using previously used high calcium-tin-lead alloys. Indeed, the cycle life at elevated temperatures, when subjected to the industry standard SAE J240 Life test, has been increased substantially.

While the invention is susceptible of various modifications and alternative forms, specific embodiments thereof have been shown by way of example in the drawings and will hereafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION OF THE INVENTION

Pursuant to the present invention, the frames employed in making the batteries utilize grids formed from calcium-tin-lead alloys, characterized by a relatively low calcium content. To this end, the grid is formed using a lead-based alloy having the following alloying ingredients: calcium in the range of from about 0.02 to about 0.04% by weight and tin in the range of from about 0.3 to about 0.5% by weight.

The alloy composition is formed into a rolled strip which is then slit and expanded, as is known, to form the desired grid mesh. The strength characteristics of the rolled strip from which the grid is made, and indeed the resulting grid mesh itself, has strength characteristics inadequate for use in conventional lead-acid battery grids. However, when used in the frame employed in the modular batteries of this invention, it has been found that sufficient strength is imparted because of the frame itself to allow satisfactory use in the modular, multicell battery of the present invention. Stated differently, despite the undesirable strength characteristics, it has been found that such alloys will form grid structures that can be processed at what are considered to be acceptable commercial rates to form the frames necessary for the modular batteries of this invention.

Figure 1:
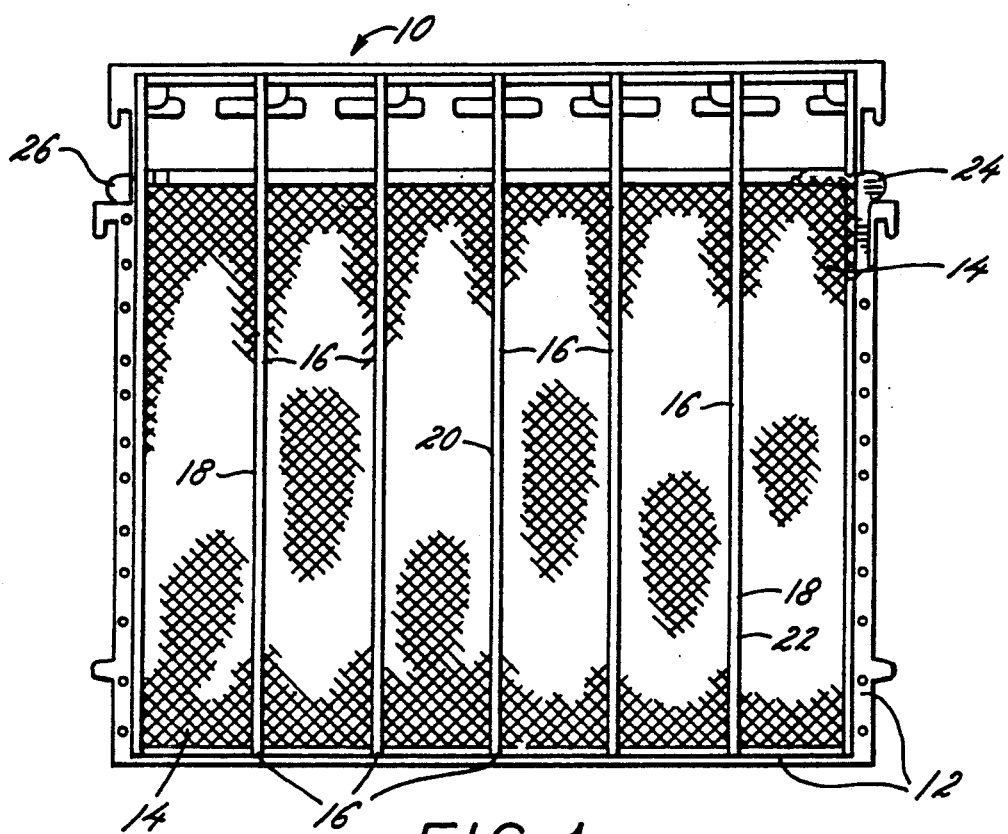
FIG. 1 is a perspective view of a terminal frame.

Turning now to the drawings, FIG. 1 shows a terminal frame 10 including a frame portion 12. The mesh grid 14 is embedded, as by injection molding, in frame portion 12. Partitions 16 separate the frame into cells. The mesh grid 14 is cut as shown generally at 18, 20 and 22 so that the terminal frame has a single cell adjacent to the sides of the frame and two internal double cells. As may be appreciated, the mesh grid 14 extends, in those double cells, through the partitions 16, thus serving as the intercell connector. Copper strips 24, 26 allow connection to the terminals (not shown).

Figure 2:
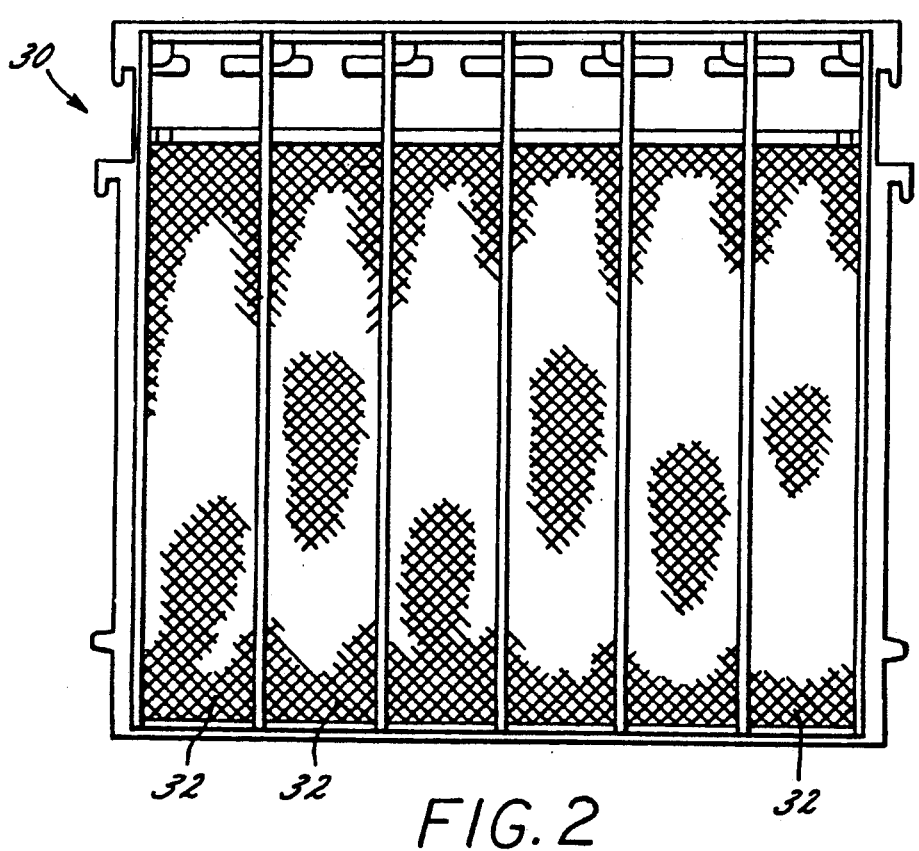
FIG. 2 is a perspective view of a floating frame.

FIG. 2 shows a floater frame 30 which is similar to terminal frame 10 except that floating frame 30 does not include any copper or other strip 24 for connection to the terminals. Further, the mesh grid 32 of floating frame 30 is cut so as to provide three sets of two interconnected cells.

In assembling the modular batteries of this invention, the terminal frames 10 are alternated with the floater frames 30. Assembly can start with either a terminal or floater frame. As may be appreciated, a separator is positioned between adjacent frames. The number of pairs of terminal and floater frames used will dictate the particular battery capacity. The cutting pattern of the mesh grid 14 in terminal frame 10 and of mesh grid 32 in floater frame 30 provides the appropriate current path.

Figure 3:
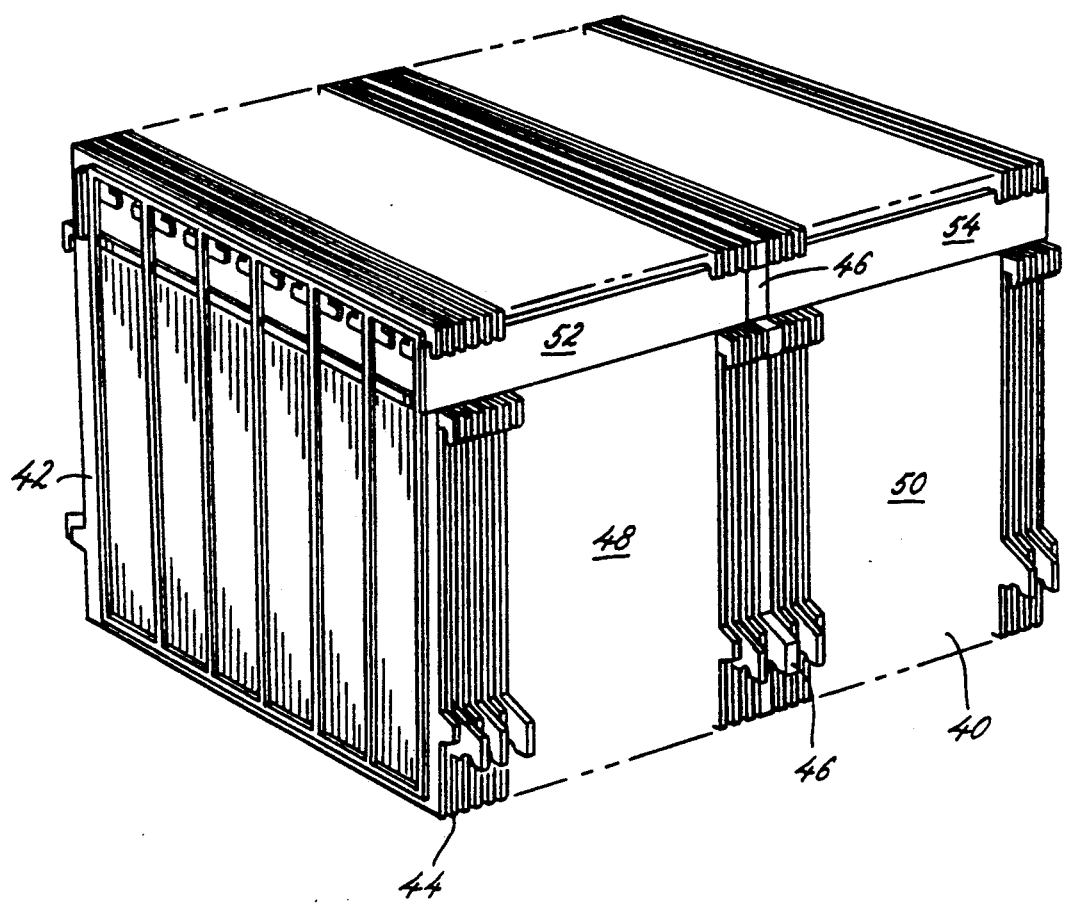
FIG. 3 is a perspective view of a modular, multicell battery in accordance with the present invention.

FIG. 3 shows a modular, multicell battery 40 using the terminal and floater frames of the present invention. The construction of the modular battery 40 is described in the previously mentioned patents, e.g., U.S. Pat. No. 3,941,615. Thus, the assembly, and welding together, of the respective frames form a top, bottom and two opposite side walls for the battery. The remaining two ends of the battery are provided by the end plates 42 secured and sealed to the end frames of the assembly to complete the battery case. Each end plate 42 is of the same shape as the frames 10 and 30, but is made of a plastic material and includes a perimeter frame and partition elements. Each terminal frame 10 and floater frame 30 is separated by a separator frame 44.

Barrier frame 46 separates the modular battery into two separate batteries. Barrier frame 46 may be of the same construction and plastic material as the end plates 42 just described. This barrier frame may be bonded or welded to the terminal or floater frames to form a complete seal along the full perimeter and the full length of each division element. The barrier frame 46 completely isolates the frames on either side thereof from one another so that there is no internal electrical or chemical interaction, thus forming two batteries 48 and 50.

The respective batteries are thus provided with independent positive terminal strips 52 and 54 and a common negative terminal strip not shown. Each terminal strip is provided with a suitable threaded stud and nut assembly for convenient connection into appropriate circuits.

As to the active material paste utilized, the specifics do not form a part of the present invention and may be varied as desired. In general, the active material paste utilized will be the same as used in conventional lead-acid batteries. It may be desirable to use a slightly lower density paste than what is used in conventional batteries The electrolyte used is aqueous sulfuric acid. While the specific gravity may be varied as desired, it has been found desirable to employ aqueous sulfuric acid having a specific gravity of about 1.280 at 80° F.

The plastic material used for the frames, end plates and barrier element can be any material desired that is capable of withstanding the lead-acid battery environment adequately to provide the desired service life. It is preferred to utilize a plastic material that can be injection molded and friction welded. A suitable commercially available material is a glass-filled polypropylene.

Figure 4:
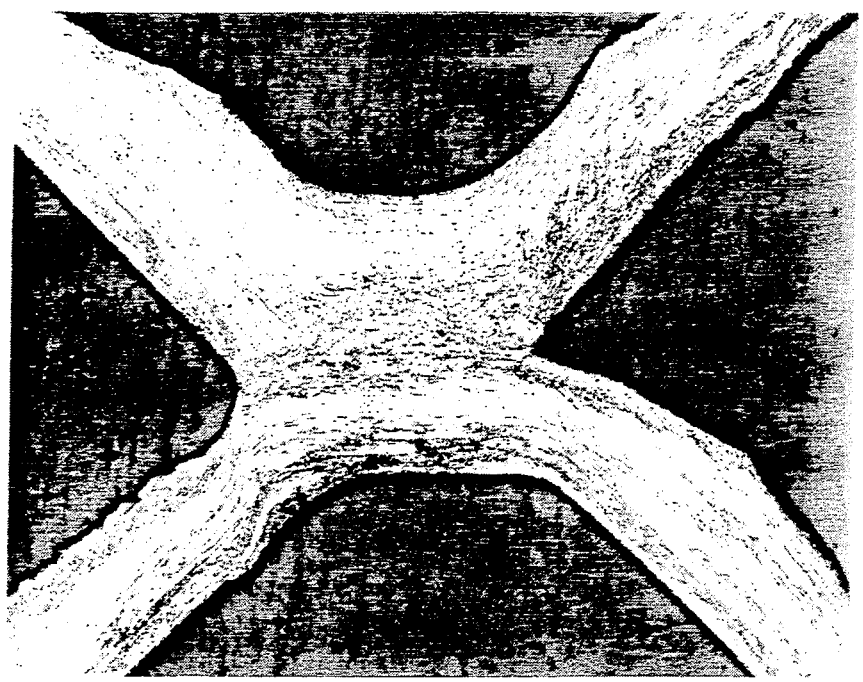
FIG. 4 is a photomicrograph, taken at 40× amplification, of an expanded rolled lead alloy strip used to make grids for modular, multicell batteries.
Figure 5:
FIG. 5 is a photomicrograph, at 100× amplification, of yet another lead alloy rolled and expanded strip used to make grids for such modular batteries.
Figure 6:
FIG. 6 is a photomicrograph, at 50× amplification, and illustrating the microstructure of a rolled lead alloy strip that can be used to make the expanded grids in the frames of the present invention.
Figure 7:
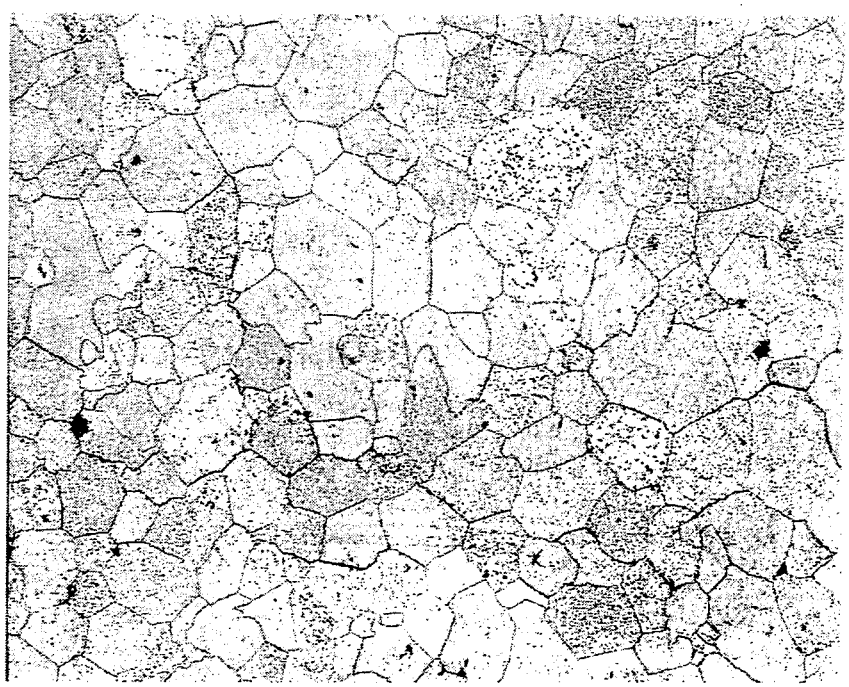
FIG. 7 is a photomicrograph, at 50× amplification, and showing the drum side surface of a directly cast strip that can be used to form the frames of this invention.

Turning to FIGS. 4-6, these photomicrographs show the microstructure of expanded grids made from wrought or rolled strips made from various alloys. FIGS. 4 and 5 show, respectively, a lead-based alloy containing 0.08% by weight calcium and 0.5% by weight tin and an alloy containing 0.065% calcium and 0.6% tin. In contrast, FIG. 6 shows the microstructure of a wrought strip made from an alloy containing 0.03% calcium and 0.46% tin. FIG. 7 shows a strip directly cast using a Cominco drum casting machine. The strip shown has a thickness of 0.025 inches and was made from, an alloy having a composition of 0.031% calcium and 0.4% tin. The contents of all of the alloys are based upon the total weight of the alloy.

Modular, multicell batteries were made having grids formed of the different alloys described in connection with FIGS. 4-7. Such batteries were subjected to conventional SAE J240 Life test at temperatures of 105° F. and 167° F. There were no differences considered to be of any significance in the cycle life at 105° F. as the calcium and tin contents of the alloys were varied.

However, surprisingly, there were drastically different results in the tests conducted at 167° F. The modular multicell batteries using a mesh grid made from the alloy of FIG. 4 had a cycle life ranging from 1000-1300 cycles. The batteries made with the alloy described in connection with FIG. 5 were only slightly better, having a cycle life which varied from 1300-2200.

In sharp contrast, the modular multicell battery of the present invention using the alloy described in connection with FIG. 6 showed a cycle life that ranged from 3000-4300. These results were for mesh grids made from strips having a thickness of 25 mils. Similar results were achieved with batteries using the same alloy but having mesh grids made from strips of 29 mils in thickness; the cycle life for such batteries ranged from 3000-4500.

While the microstructures of the directly cast alloy (FIG. 7) varied significantly from that of a rolled strip of similar composition (FIG. 6), the cycle life test for modular batteries having mesh grids made from such cast alloy provided a cycle life range from 2600-4300 using a cast strip of 25 mils.

In the particular test described, it was believed that other corrosion factors were affecting the cycle life somewhat. However, regardless of the specifics, the trend is believed to be real. Dramatic increase in cycle life, particularly at elevated service life temperatures is capable of being achieved in the modular, multicell batteries of the present invention using the low calcium-tin lead-based alloys described herein.

While it is preferred to use a rolled or wrought strip to form the mesh grid, a directly cast strip followed by grid mesh expansion could also be desirably used. It is believed that the same or similar desirable corrosion resistant properties evident from grids made with rolled strips can likewise be achieved. Indeed, while considered less desirable, the grids may be made using well known gravity casting techniques.

Thus, as has been seen, the present invention provides a modular, multicell battery having desirable positive grid corrosion resistance, particularly when exposed to elevated temperatures.

I claim:

1. A modular, multicell automotive SLI battery including a plurality of frames formed of a moldable material which is electrically insulating at the intended operating voltage of the battery and is inert to the active materials of the battery, each frame defining a plurality of separate active material support areas arranged in side-by-side relationship across the width of the frame, an electrically conductive grid embedded in, and supported by, the frame to provide support for active material, each frame including portions forming divisions between adjacent active material support areas of the frame, the frames being arranged in a side-by-side relationship in a direction normal to the width of the frame with the portions of each frame forming the divisions between adjacent active material support areas secured in a sealed relationships to the corresponding portions in adjacent frames to form partitions between adjacent cells of the battery, said grid being of a ternary lead-based alloy consisting essentially of lead, from about 0.02 to 0.04% calcium and from about 0.3 to 0.5% tin, the percentages of calcium and tin being based upon the weight of the alloy.

2. The battery of claim 1 wherein said grid is an expanded metal mesh grid.

3. The battery of claim 2 wherein each frame is of rectangular form having a continuous perimeter member and a number of division portions parallel to opposite sides of the frame to define the active material support areas, the perimeter member and division portions of adjacent frames interfitting so that the perimeter member forms two opposing walls, a top and a bottom of the battery and the division portions form the cell portions of the battery.

4. The battery of claim 3 wherein the frame members are adapted to interfit one with the other when assembled in the side-by-side relations.

5. A frame for a modular, multicell automotive SLI battery formed of a moldable material which is electrically insulating at the intended operating voltage of the battery and is inert to the active materials of the battery, said frame defining a plurality of separate active material support areas arranged in side-by-side relationship across the width of the frame, an electrically conductive grid embedded in, and supported by, said frame to provide support for the active material, said grid being of a ternary lead-based alloy consisting essentially of lead, from about 0.02 to 0.04% calcium and from about 0.3 to 0.5% tin, the percentages of calcium and tin being based upon the weight of the alloy.

6. The frame of claim 5 wherein said grid is an expanded metal mesh grid.

7. The frame of claim 6 wherein said frame is of rectangular form having a continuous perimeter member and a number of divisions portions parallel to opposite sides of the frame to define the active material support areas, the perimeter member, when interfitted with similarly configured frames, forming two opposing walls, a top and bottom of the battery, and the division portions forming the cell portions of the battery.

8. The frame of claim 7 wherein said frame is adapted to interfit with a similarly configured frame when assembled in a side-by-side relation.

* * * * *